United States Patent [19]
Golan

[11] 3,913,416
[45] Oct. 21, 1975

[54] DOWNSHIFT INHIBITOR SYSTEM FOR AUTOMATIC TRANSMISSION CONTROL

[75] Inventor: Kenneth Frank Golan, Pekin, Ill.

[73] Assignee: Caterpillar Tractor Co., Peoria, Ill.

[22] Filed: Aug. 2, 1974

[21] Appl. No.: 494,301

[52] U.S. Cl. .................................. 74/752 C; 74/859
[51] Int. Cl.² ..................... F16H 3/74; B60K 41/04
[58] Field of Search ........................ 74/752 C, 859

[56] References Cited
UNITED STATES PATENTS

| | | | |
|---|---|---|---|
| 3,313,183 | 4/1967 | Bailey et al. | 74/752 |
| 3,578,007 | 5/1971 | Blake | 137/51 |
| 3,691,872 | 9/1972 | Schaefer et al. | 74/864 |
| 3,709,064 | 1/1973 | Schaefer et al. | 74/752 A |
| 3,738,198 | 6/1973 | Kell | 74/868 |
| 3,789,698 | 2/1974 | Williams | 74/752 C |
| 3,818,783 | 6/1974 | Norris et al. | 74/869 |

*Primary Examiner*—Leonard H. Gerin
*Attorney, Agent, or Firm*—Ralph E. Walters

[57] ABSTRACT

An automatic transmission control for the automatic range of a transmission has a power control valve for selecting a desired gear ratio with a manual control valve operable to set the desired gear selection. A plurality of shift reference pressures are established and applied to different ones of a plurality of selector valves which are also subjected to governor pressures dependent upon the transmission output speed for automatic operation to set the control valve at a particular position to establish a gear selection up to the highest gear selection manually selected by an operator and subject to the transmission output speed. The action of the selector valves is inhibited in downshift of the transmission as demanded by physical movement of the manual control valve to a lower gear setting by structure associated with the selector valve members which prevents the delivery of a forced downshift pressure signal, set by the manual control valve, to a particular selector valve until said selector valve has shifted as the result of automatic downshift in response to a reduction in the governor pressure signal.

7 Claims, 8 Drawing Figures

Fig. 3

DOWNSHIFT INHIBITOR SYSTEM FOR AUTOMATIC TRANSMISSION CONTROL

BACKGROUND OF THE INVENTION

This invention relates to an automatic transmission control and downshift inhibitor system which provides for automatic shift of the gear ratio of the transmission within a range of operation and permits an operator to set a desired lower gear of operation but inhibits the downshift of the transmission in accordance with the transmission output speed in order to avoid engine overspeed resulting from downshift.

The assignee of this application has an automatic transmission control as disclosed in U.S. Pat. No. 3,452,621 wherein the multi-speed transmission has a manual range of operation and a second group of gear ratios operable in an automatic range of operation. An operator can set a manual control valve at a desired gear in the automatic range and the control disclosed in this patent provides for automatic upshift and downshift up to the gear manually set and down to the highest gear in the manual range of operation. When an operator manually sets the gear selector to a lower gear, it is possible for the control in the patent to provide a resulting downshift to the transmission which could result in overspeeding the engine and resulting damage thereto.

U.S. Pat. Nos. 3,613,480 and 3,682,014 disclose power transmissions and a recognition of the desirability of inhibiting downshift. In each of these patents, the downshift is inhibited by restriction of movement of the manually operable gear selector with the result that an operator cannot set the desired gear by movement of the gear selector until such time as the gear selector is released for movement.

U.S. Pat. No. 3,709,064 discloses a transmission control utilizing solenoid operated valves for shifting the transmission and with governor pressure responsive inhibitor valves operable to block operation of the solenoid operated valves. The control disclosed in this patent does not provide for automatic upshift and downshift in the automatic range of operation with the additional provision for forced downshift by an operator which is inhibited and dependent upon the transmission output speed.

The applicant has a pending application, Ser. No. 451,012, filed Mar. 14, 1974, which discloses two embodiments of a downshift inhibitor system for automatic transmission controls. In both embodiments disclosed therein, an automatic transmission control is provided wherein a large number of selector valves are all subjected to the same shift reference pressure signal and with the selector valves arranged in pairs with respect to application of different governor pressure signals thereto in opposition to the shift reference pressure signals. In one of said embodiments, forced downshift is inhibited; however, downshift can occur at a transmission output speed and, therefore, at a value of governor pressure signal higher than when automatic downshift would occur. In the second of said embodiments, forced downshift is inhibited with such downshift occurring when the governor pressure signal reaches the level wherein automatic downshift occurs. In both of said embodiments, it is necessary to have said pairs of selector valves which are subject to the same governor pressure signal have valve components of different sizes in order to differentiate the sequencing of the transmission control because of the application of the same value of shift reference pressure signal thereto.

SUMMARY

In the transmission disclosed herein, there is a manual range of operation including reverse, neutral, and first and second gears, with an automatic range of operation between second and eighth gears. The manual gear selector positions a manual control valve to provide for transmission operation in the manual range or for operation in the automatic range. The control disclosed herein will automatically upshift and downshift the transmission in the automatic range up to the gear selected by the operator and with said shifts being dependent upon the transmission output speed. The operator can move the gear selector for the manual control valve to a desired setting for a forced downshift, immediately; however, the invention disclosed herein will inhibit the actual downshift of the transmission until a transmission output speed is reached equal to that which causes an automatic downshift, with the result that overspeeding of the prime mover engine is avoided.

A primary feature of the invention is to provide a downshift inhibitor system for a transmission control having a plurality of selector valves subject to a plurality of different shift reference pressure signals as well as governor pressure signals having a magnitude proportional to transmission output speed whereby a forced downshift pressure signal cannot be applied to a selector valve to cause downshift until the particular selector valve moves as part of the automatic downshift operation. Thus, the downshift cannot be forced and does not occur until a desired transmission output speed is reached and overspeeding of the engine is avoided.

With the system disclosed herein, the operator may immediately set the desired lower gear and the required downshifting of the transmission through a plurality of speeds, if demanded, will occur successively, as transmission output speed decreases, without overspeeding of the engine.

An additional feature of the invention is to provide an automatic transmission control and downshift inhibitor system wherein there are a series of transmission gear ratios within an automatic range of operation, with a plurality of selector valves having at least a pair of selector valves with valve members responsive to different shift reference pressures and the same governor pressure established in proportion to the transmission output speed to provide for automatic upshift and downshift within a part of the automatic range of operation, with means for applying a forced downshift pressure signal to one of said pairs of selector valves with means on the valve member of said one selector valve for preventing application of said forced downshift pressure signal thereto until the selector valve member has moved to a position to automatically initiate a downshift, with the result that a downshift cannot be forced until such time as the transmission output speed and the governor pressure signal generated are at a level wherein automatic downshift occurs.

DESCRIPTION OF THE PREFERRED EMBODIMENT

Figure 1:
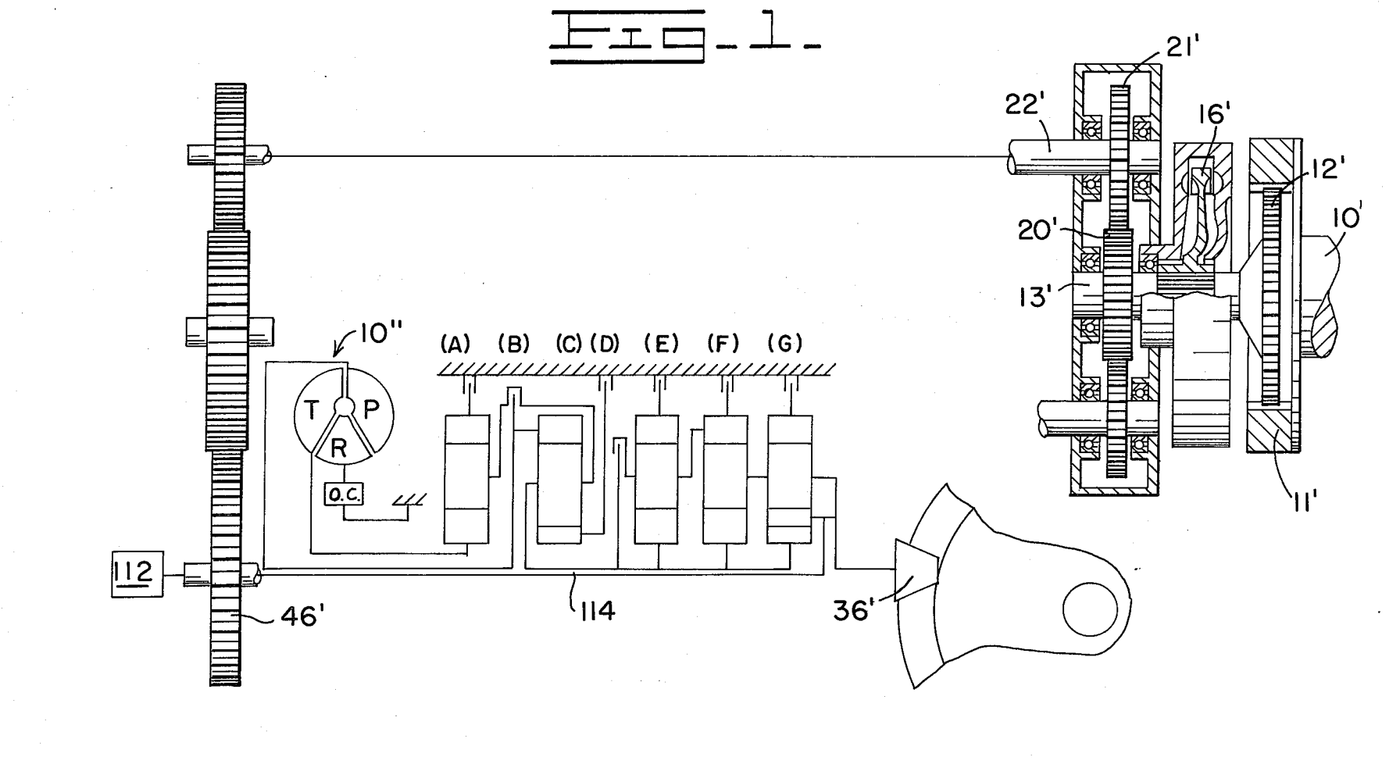
FIG. 1 schematically illustrates a transmission drive train to which the invention is applied.

The transmission drive train is illustrated in FIG. 1 and is the same illustration as given in U.S. Pat. No. 3,452,621 and with the same reference numerals applied thereto as in said previous patent. An engine driven shaft 10' is suitably arranged to drive a flywheel 11'. A gear 12' is preferably splined to the flywheel and a rotor shaft 13' to which in turn drives a rotor 16'. The rotor shaft 13' is suitably arranged to drive a pair of transfer gears 20' and 21'. The gear 21' is further arranged to drive a gear shaft 22' to provide a power input to a multi-speed gear assembly by means of the schematically illustrated transfer gears. A transfer gear 46' is arranged to provide a power input to the multi-speed assembly comprising a torque converter 10" and a power train comprising a series of brakes and clutches arranged to be selectively actuated. The multi-speed gear assembly is suitably arranged to drive an output member or pinion gear 36' which operatively meshes with a face gear of the vehicle's differential. The clutches and brakes may also be termed "drive establishing means".

Figure 2:
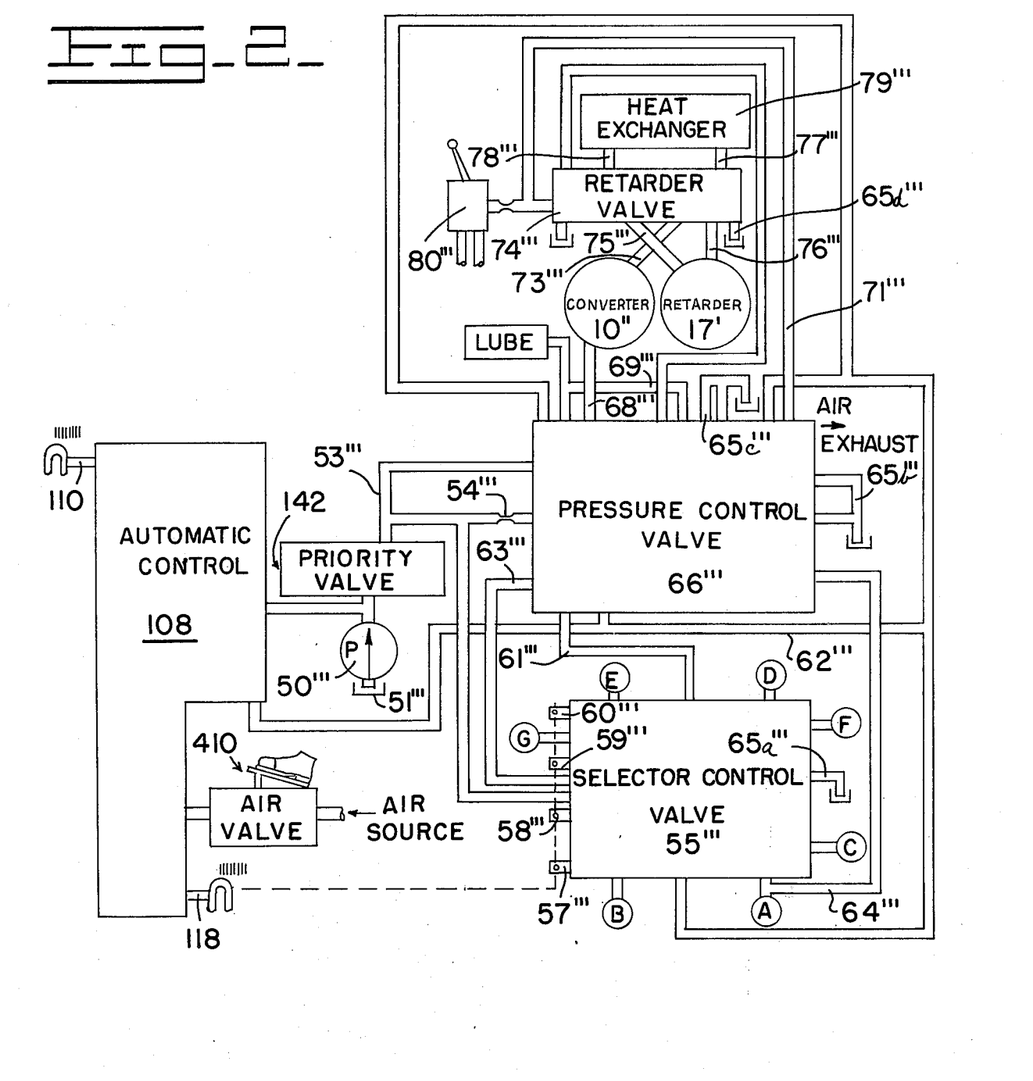
FIG. 2 schematically illustrates the automatic transmission control with downshift inhibitor system in conjunction with the hydraulic system for engaging the transmission drive train of FIG. 1.

This disclosure of U.S. Pat. No. 3,452,621 is incorporated herein by reference and reference may be made thereto for a more detailed understanding of the foregoing structure as well as to additional related prior patents of the assignee of this application, namely U.S. Pat. Nos. 3,347,113, 3,352,385, and 3,386,540, which are incorporated by reference in the first of the above-mentioned patents. The hydraulic control system utilized to selectively actuate the transmission drive train illustrated in FIG. 1 is shown in FIG. 2. FIG. 2 of this application generally corresponds to FIG. 2 of U.S. Pat. No. 3,452,621. The same reference numerals have been applied as used in U.S. Pat. No. 3,452,621. A positive displacement pump 50''' is suitably connected to the vehicle by gear means (not shown) to pump pressurized fluid from sump 51''' through a priority valve 142 and through a conduit 53''' to a branch passage having a flow restriction 54''', to a pressure control valve 66''' and to a selector control valve 55'''.

The selector control valve 55''' comprises a housing constructed and arranged to slidably mount a plurality of valve spools 57'''', 58'''', 59'''', and 60''''. The valves function to selectively communicate fluid to clutches and/or brakes A through G as identified in FIG. 1. Conduits 61'''', 62'''', 63'''' and 64'''' and drain conduit 65a'''' communicate with the selector control valve.

Pressure control valve 66'''' is integrated into the system and arranged to communicate with aforementioned conduits 53'''' and 61''''–64''''. In addition, the pressure control valve communicates with the torque converter 10" in the conduit 68'''', lubrication conduit 69'''', drain conduits 65b'''' and 65c'''', and a conduit 71'''' of a hydrodynamic retarder system.

FIG. 2 also schematically illustrates a retarder control system, arranged to be supplied with fluid by converter 10" via conduit 73''''. A retarder control valve 74'''' is arranged to be selectively actuated to communicate fluid from conduit 73'''' to a conduit 75'''' which, in turn, communicates with retarder 17'. A conduit 76'''' is arranged to selectively communicate through the retarder control valve 74'''' to a drain conduit 65d'''' or a conduit 77''''. Conduit 77'''' and a conduit 78'''' are arranged to communicate the fluid through a conventional heat exchanger 79'''' to cool the fluid passed through the torque converter and retarder.

An air control valve 80'''' is arranged to selectively activate the retarder control valve. This air control valve may be of the type disclosed in U.S. Pat. No. 3,057,666.

In the description of the control and system, certain pressure values have been and will be assigned to various portions thereof and it should be understood that these relative values are for illustrative purposes and that other similarly-related values could be used and be within the scope of the invention.

Figure 4:
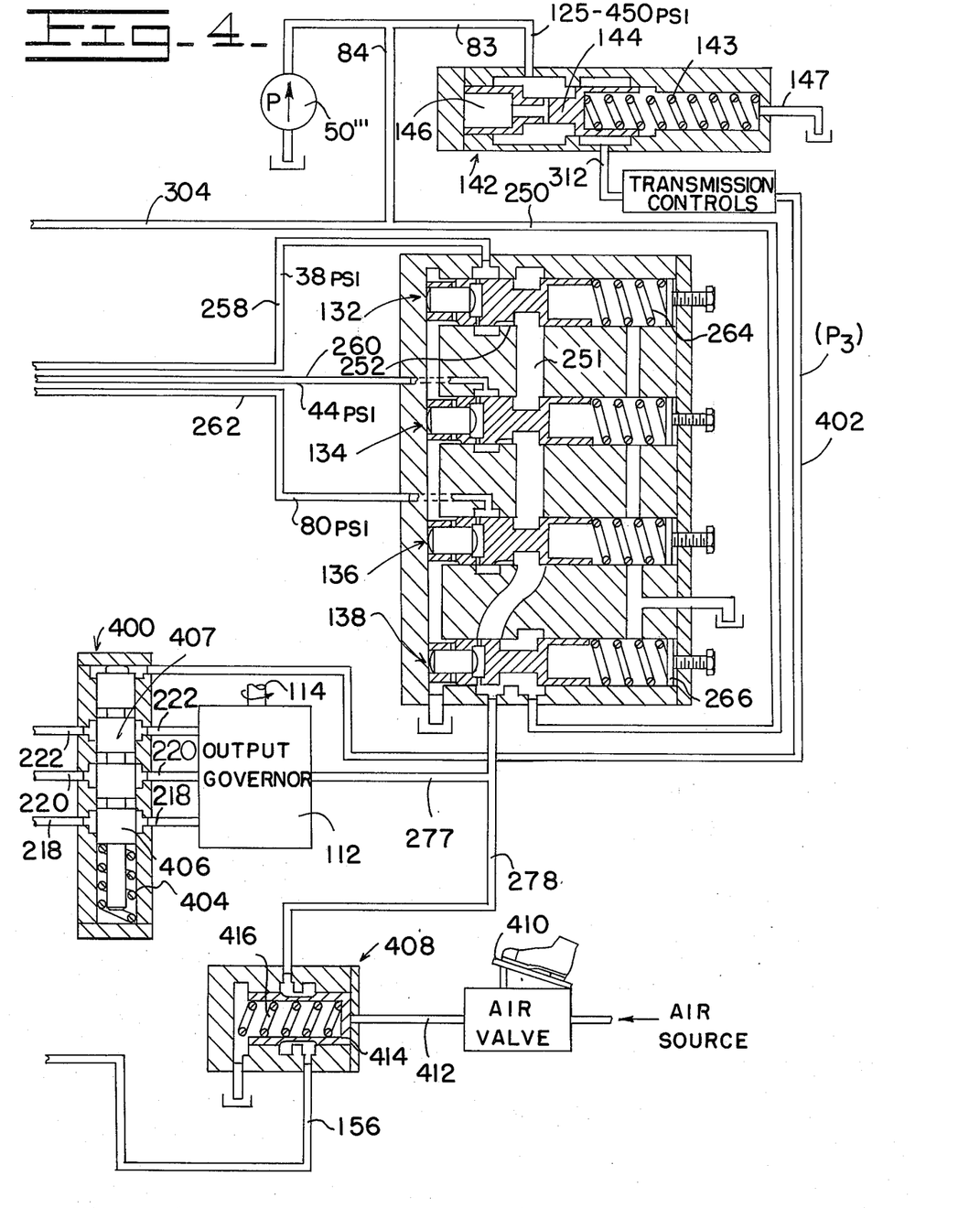
FIG. 4 is a sectional view showing additional components of the control and system of the present invention.

Referring now to FIG. 4 in conjunction with FIGS. 1 and 2, the pump 50'''' continuously supplies pressure fluid in a range from 125 to 450 p.s.i. to conduits 83 and 84. Conduit 83 supplies pump pressure to a priority valve 142 which has a coil spring 143 for biasing spool 144 to the closed position shown whenever the pressure in conduit 83, and consequently spool cavity 146 drops below 125 p.s.i. Normally, however, the pressure in conduit 83 is at least 125 p.s.i. thereby moving priority valve spool 142 to the right so that the fluid pressure of conduit 83 is communicated to the transmission controls by way of conduit 312. A drain 147 is provided on the priority valve to prevent any hydraulic lock which might occur due to fluid leakage.

Conduit 84 leads to the automatic transmission control shown generally at 108 in FIG. 2. The automatic control in general serves to communicate the position of a manual control spool 110 so as to remotely and automatically position a power spool 118 which through any suitable linkage automatically controls the selector valve spools 57'''', 58'''', 59'''' and 60''''. The automatic transmission control 108 senses load through an output governor 112 which measures the speed of the output planetary carrier of the power train shown in FIG. 1. As shown, the output governor 112 is mechanically connected to the output carrier of the power train through a long quill shaft 114. The governor 112 provides a plurality (three in the instant application) of separate hydraulic pressure signals which are in direct proportion to the aforementioned output speed and upon which the various shift points of the system depend. The specific details of the governor are not the subject of this application and any suitable type may be utilized. It is preferred, however, to use a governor of the type disclosed in assignee's U.S. Pat. No. 3,450,144 and such disclosure is incorporated herein by reference.

Figure 3:
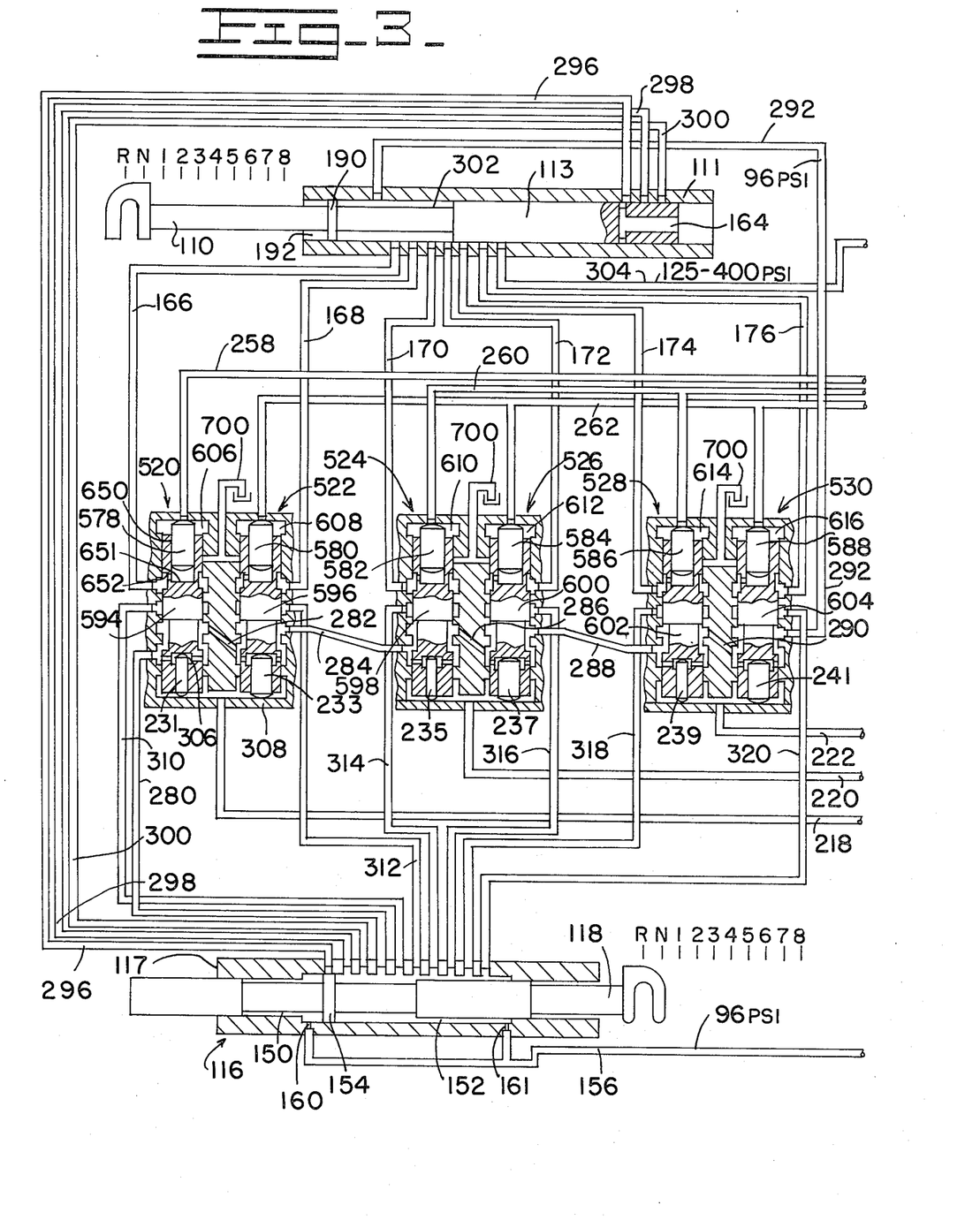
FIG. 3 is a sectional view showing a number of components of the control and system of the present invention.

As shown in FIGS. 3 and 4, conduit 84 normally supplies 125 p.s.i. minimum to conduit 304 which in turn supplies this pressure to housing 111 of a manually controlled valve spool 110. Valve spool 110 has an enlarged portion 113 which, depending upon its position, can either block off conduits 296, 298 and 300 or selectively drain them via groove and port arrangement 164. The valve housing 111 is also provided with a compartment 302 which may selectively communicate with a conduit 292 and with a group of conduits 166, 168, 170, 172, 174 and 176 which latter conduits may hereinafter be referred to as "hold" lines. These hold lines further communicate with a series of automatic selector valves which will be described in greater detail infra.

The spool 110 is also provided with a land 130. With rightward movement of manual control spool 110, the pressure normally present in "hold" lines 166, 168, 170, 172, 174 and 176 is initially shut off as the spool land 190 passes thereover and then subsequently these "hold" lines are opened to communicate with a drain 192.

As shown in FIG. 4, conduit 84 also communicates with a conduit 250 which leads to a downshift reducing valve 138. As will be more fully understood in the subsequent discussion, the downshift reducing valve functions to reduce the pressure supplied by conduit 250 which is normally over 400 p.s.i., to a pressure of 96 p.s.i. which is communicated to a common rail conduit 251. The conduit 251 then communicates the 96 p.s.i. to a plurality of shift reference valves 132, 134 and 136. The valves 132, 134 and 136 are all conventional pressure reducing valves and of identical construction having throttling slots 252 which serve to establish reduced reference pressures from the common rail pressure in conduit 251 through adjustment of valve spool biasing springs 264. In the instant application, the valves 132, 134 and 136 meter at their respective throttling slots 252 to establish reference pressures of 38 p.s.i., 44 p.s.i. and 80 p.s.i. in conduits 258, 260 and 262. The conduits 258, 260 and 262 are variously connected to a series of automatic selector valves 520, 522, 524, 526, 528 and 530 (FIG. 3) for a purpose which will be more clearly understood, infra.

Downshift reducing valve 138 is supplied with fluid at 125 to 450 p.s.i. from conduit 250 as mentioned above. In construction, the downshift reducing valve 138 is similar to the shift reference pressure valves 132, 134, and 136. However, it handles larger flow and this makes unnecessary any throttling slot arrangement. Manual adjustment of the biasing spring means 266 may be used to adjust the setting of downshift reducing valve 138 to approximately 96 p.s.i. which, as a consequence, will control all of the downshift points of the system in a manner which will be further understood from the discussion infra. For the present discussion, it should be noted that the 96 p.s.i. flowing out of the valve 138 is not only communicated to passage 251 but also to the output governor 112 via conduit 277 and to a hold valve 408 via conduit 278. The hold valve 408, whose function will be specifically described later, is normally in the open position, as shown, such that the 96 p.s.i. flowing out of the downshift reducing valve 138 is normally communicated through conduit 156 to compartments 150 and 152 of a power cylinder assembly 116 (see FIG. 3).

Structural elements corresponding to those in U.S. Pat. No. 3,452,621 have been and will be given the same reference numerals as in said patent, with different and/or modified structure given reference numerals above 500.

As shown in FIG. 3, the 96 p.s.i. of conduit 156 communicates with compartments 150 and 152 disposed on either side of a spool land 154 formed on the power spool 118. The diameter of land 154 is larger than the diameter at the ends of the spool in order to provide a differential area so that if the pressures in compartments 150 and 152 are different the spool will move. Flow limiting orifices 160 and 161 are provided at the power spool to control fluid flow into chambers 150 and 152. Conduits 296, 298 and 300 lead out of the power spool assembly 116 for communication with the manual control valve housing 111 as previously described. Conduits 280, 310, 312, 314, 316, 318 and 320 all communicate with various members of the selector valves 520, 522, 524, 526, 528 and 530 in a manner which will be more fully understood from a later description with regard to the selector valves. The power spool is positioned by balancing of the spool land 154 to equal pressures in compartments 150 and 152. The position is determined by draining one of conduits 296, 298, 300, 280, 310, 312, 314, 316, 318, or 320 and having land 154 cover said conduit.

As shown in FIG. 3, the selector valves 520, 522, 524, 526, 528, and 530 are provided for effecting an automatic shift when the proper shift point is reached. Each of the selector valves is similarly constructed and is mounted within a housing 308 having internal bores or cavities 606, 608, 610, 612, 614, and 616. Each of the respective bores mounts a movable selector spool valve member 594, 596, 598, 600, 602, and 604, of the selector valves 520–530, each of which has a cavity 306 in its lower end for receiving one of the smaller downshift slugs 231, 233, 235, 237, 239, and 241. It should be noted that when all of the selector valve members or spools 594–604 are in their lower positions, as shown in FIG. 3, fluid pressure may be communicated from conduit 280 through each of the selector valves 520–530 to the conduit 292 by means of conduits 282, 284, 286, 288, and 290.

Each of the movable selector valve members 594–604 has an annular wall 650 at the upper end thereof, as shown in FIG. 3, defining a cavity 651 with the cavities housing the respective movable holding slugs 578, 580, 582, 584, 586 and 588. The annular wall 650 of each selector valve member has a flow passage 652 extending therethrough to communicate the base of the cavity 651 with the valve bores 606–616.

The selector valve housing 308 divides the six selector valves 520–530 into three groups. Each group contains two selector valves which sense pressure from the output governor 112 via three conduits 218, 220, and 222. These three conduits communicate three different speed-sensitive governor pressures, denoted as pressure curves X, Y and Z in FIG. 8, to the lower ends of the paired selector valve members 594–604. Other conduits 258, 260, and 262 communicate shift reference pressure signals from the shift reference pressure valves 132, 134, and 136 to the selector valve bores 606–616. Thus, conduit 258 communicates 38 p.s.i. to bore 606 above selector valve member 594 and holding slug 578 whereby the upper end of the holding slug and the annular end wall of the valve member define a pressure-responsive area responsive to shift reference pressure. Conduit 260 communicates 44 p.s.i. to selector valve bores 610 and 614 above selector valve members 598 and 602 to apply shift reference pressure to the pressure-responsive areas thereof. Conduit 262 communicates a shift reference pressure of 80 p.s.i. to bores 608, 612, and 616 above selector valve members 596, 600, and 604 and the holding slugs associated therewith to apply shift reference pressure to the pressure-responsive areas of these selector valves.

It will be noted that in reverse, neutral, and first the manual valve spool 110 allows fluid pressure from conduit 292 at a value of 96 p.s.i. to flow from compartment 302 of the manual valve through conduits 166, 168, 170, 172, 174, and 176 to the selector valves 520–530, respectively, for flow communication with the bores of the selector valves at a location intermediate the ends of the selector valve members and for selective communication with the flow passage 652 through the wall of the selector valve member, depending upon the position of the selector valve member.

In order to achieve a follow-through shift, it is necessary to positively insure that a shift is made from a lower to a higher horsepower condition. This dictates that a spread is needed between the upshift and downshift points, and to do this the series of smaller slugs 231, 233, 235, 237, 239 and 241 are utilized. Such a spread means that while the upshift between any two gears in the automatic range occurs at 1 r.p.m. value, the downshift occurs at a suitably lower r.p.m. value, to prevent excessive valve shifting or hunting. Upshifts are made by comparing reference and hydraulic governor pressures directly. However, to achieve a lower required governor pressure for downshifting a third pressure is at times introduced into cavities 306 above the lower slugs 231–241. Said third pressure is higher than governor or reference pressure at the shift points and is present in cavities 306 only when the selector valve members are in their upper position as viewed in FIG. 3.

The hydraulic output shaft governor 112 provides speed-sensitive pressure signals which determine the various shift points in the automatic range. Though not shown, the hydraulic governor 112 contains three centrifugally force-operated pressure reducing valves, each having different mass and reaction surfaces as clearly disclosed in the previously referred to U.S. patent.

Figure 8:
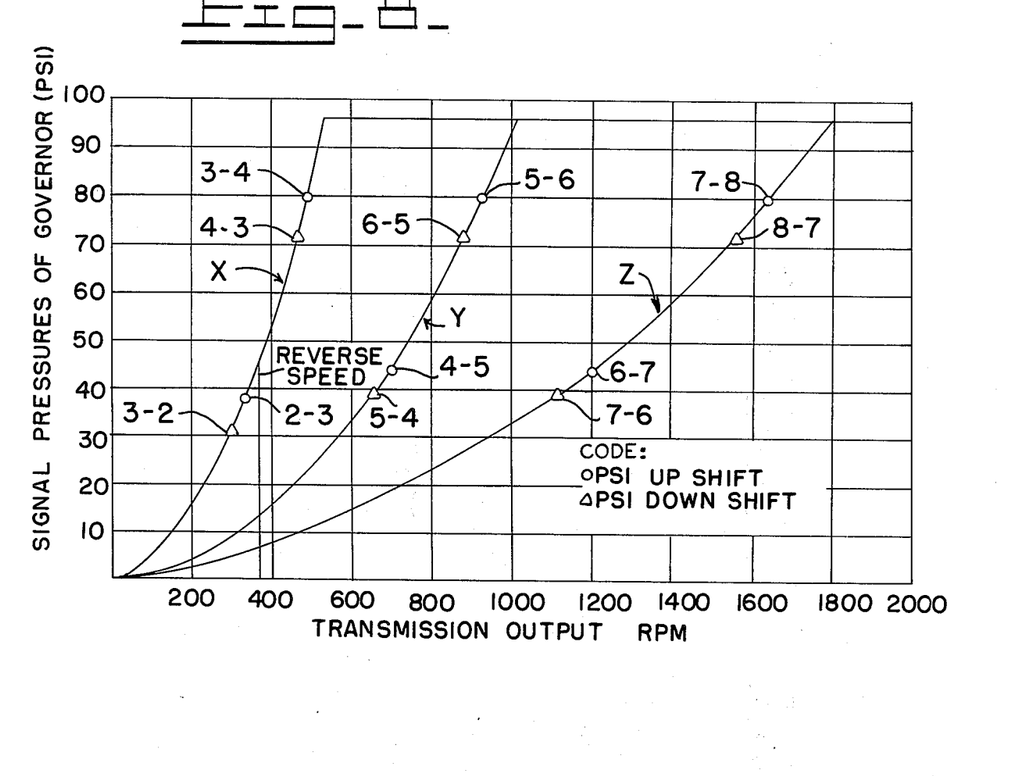
FIG. 8 is a graph illustrating three curves of governor pressures produced by a governor in response to transmission output speeds.

For purposes of the present application, it is sufficient to note that rotation of shaft 114 produces centrifugal force which acts on the three governor pressure reducing valves to result in the emission of three continuous pressure signals heretofore identified as governor curves X, Y and Z as shown in FIG. 8.

FIG. 8 illustrates that each of the governor pressure-speed curves X, Y and Z has a pressure range from 0 to 96 p.s.i. However, the r.p.m. range in which each of these curves achieves a given pressure value differs in ascending order from curve X to curve Z. Thus, for example, curve X reflects 30 p.s.i. at approximately 300 r.p.m., while curve Y reflects 30 p.s.i. at approximately 580 r.p.m. and curve Z reflects 30 p.s.i. only after the r.p.m. value has increased to approximately 930 r.p.m. As previously mentioned, these governor pressures X, Y and Z are communicated to the selector valve groups via conduits 218, 220 and 222 such that when the proper r.p.m. is reached in the automatic range, the selector spools 594–604 will move upwardly or downwardly, according to whether vehicle conditions warrant and demand an upshift or downshift.

During a shift transient pressure oscillations could be communicated through governor 112 due to power train "wind up" which pressure oscillations could result in the communication of erroneous shifting signals to the selector valves. To prevent such occurrences, a blocker valve 400 is provided on the downstream side of governor 112. The blocker valve 400 serves to delay or cut-off the governor conduits 218, 220 and 222 from the selector valves during certain shift periods. Proper delay is afforded by communicating load clutch pressure ($P_3$) from the transmission controls to the top of valve 400 via conduit 402. During a shift $P_3$ drops sufficiently to allow a spring 404 to move spool 406 upwardly to a position whereby the lands 407 interrupt communication of the governor signals to the selector valves (see FIG. 4). Normally, the blocker valve will be set to operate whenever $P_3$ drops below approximately 200 p.s.i. and provides sufficient time for dampening of component fluctuations to a steady rate which eliminates "hunting" of the automatic control.

Figures 6, 7:
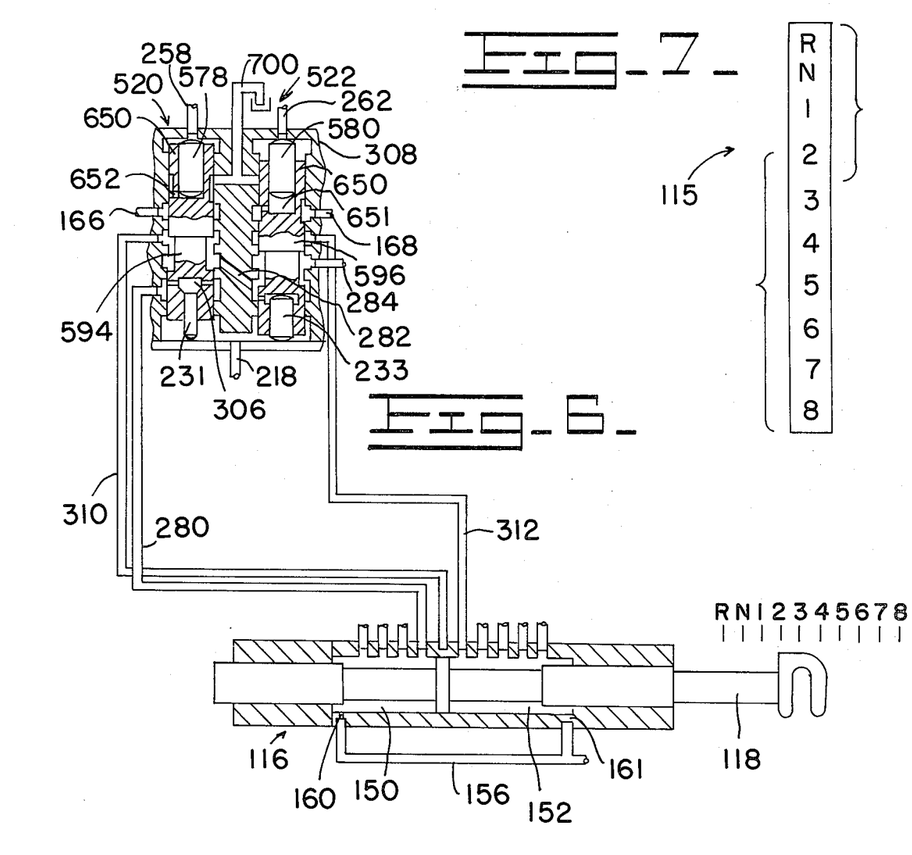
FIG. 6 is a fragmentary sectional view of parts of the control and system shown in a different operational condition from that shown in FIG. 3.
FIG. 7 is an elevational view of the operator's shift console depicting the manual and automatic ranges of operation.

The shift console 115 shown in FIG. 7 shows the one reverse, neutral, and eight forward speeds that may be manually selected by the operator. The reverse, neutral, and first two forward positions are strictly manual (rather than automatic) positions and, therefore, reflect single conditions of operation despite speed and load changes. This can be permitted because the torque converter provides a broad operating range in the lower gears; this feature serves to prevent overfrequent shifting of any automatic system when its operation would vary between two adjacent modes of operation. On the other hand, if the gear shift lever is placed in third through eighth positions the automatic system is placed into operation wherein the gear shift lever serves as the upper limit of transmission operation. In this automatic range, ground speed acts to shift the transmission up to the limit placed upon it or down to second gear. Therefore, the position of the gear shift lever is a true indication of the transmission gear only in the manual range. In other words, if the lever is placed, for example, in fifth gear automatic range, the vehicle operating conditions might dictate transmission operation in second, third, fourth or fifth and a transient or constant state. It is to be understood that it is within the scope of the invention to alter the gears comprising the manual and automatic ranges to suit the operating characteristics of the particular vehicle upon which the automatic transmission control is to be attached.

In the paragraphs below, the aforementioned features of the system will be discussed more clearly with respect to the various shift sequences.

Reverse

With the pump 50''' operating, pressure fluid at a value of at least 125 p.s.i. is communicated via conduit 83 through priority valve 142 and on through conduit 312 to the transmission controls. This same pressure fluid at 125 p.s.i. minimum is also communicated via conduit 84 to a conduit 304 leading to the manual selector valve housing 111 and also to the conduit 250. Once the operator moves the manual control valve spool 110 to the reverse position (R of FIG. 3), the enlarged land 113 of said spool blocks off communication of conduit 304 with compartment 302 of the manual control valve. The pressure fluid is then shunted through conduit 250 and communicated to the downshift reducing valve 138 which provides 96 p.s.i. to the shift reference pressure valves 132, 134 and 136 through common rail 251. Each of the shift reference pressure valves establishes a reference pressure which is variously communicated through the conduits 258, 260 and 262 to the upper ends of selector valves 520–530. Downshift reducing valve 138 also establishes 96 p.s.i. in the conduit 277 leading to governor 112 and in the conduit 278. The 96 p.s.i. in conduit 278 is then communicated through the holding valve 408 to a conduit 156 which leads through orifices 160 and 161 to compartments 150 and 152 on either side of the power spool land 154. At this point, it should be noted that conduit 296 leads out of the power spool housing 117 to the manual control spool port 164 which leads to the drain. This will drop the pressure in compartment 150, which is supplied by the orifice 160 because the restriction to the drain port is small in comparison with the orifice restriction. As a result, the power control spool land 154 will move to the position shown to block-off conduit 296 to reestablish equal pressures in compartments 150 and 152. Thus, the movement of power spool 118 results in the transmission being shifted into reverse gear. A suitable tracing of conduits 298, 300, 310, 312, 314, 316, 318 and 320 will show that they all lead to a blocked condition and therefore at this point have no effect upon the system. However, conduit 280 communicates the 96 p.s.i. in compartment 152 of the power spool assembly 116 through each of the selector valves 520–530 by way of conduits 282, 284, 286, 288 and 290 to an output conduit 292. The output conduit 292 then leads through the manual control valve compartment 302 to communicate the 96 p.s.i. to hold lines 166, 168, 170 and 172 which lead to the cavities of the first four automatic selector valves 520, 522, 524 and 526. Thus, the 96 p.s.i. pressure in the hold lines 166, 168, 170 and 172 prevents any automatic shifting, since it is greater than the highest counterbalancing pressure that could be supplied to the bottom of selector valves 520, 522, 524 and 526 from the output governor conduits 218 and 220. This latter feature can also be noted from FIG. 8 wherein it is illustrated that the governor pressures corresponding to a transmission output r.p.m. of approximately 380 r.p.m. for reverse are appreciably lower than the 96 p.s.i. supplied from the hold lines 166, 168, 170 and 172.

Neutral

Movement of manual control valve spool 110 to the right communicates the conduit 298 to drain through opening 164. Consequently, pressure in power cylinder compartment 152 drops due to orifice 161 allowing the higher pressure in compartment 150 to move power spool 118 rightwardly until land 154 covers conduit 298 (N). Since conduit 298 is the only conduit leading to a drain, and all other conduits leading from the power spool are blocked, movement of the power spool is independent of the position of the selector valves.

First

Essentially the same as reverse and neutral above, wherein a conduit 300 is opened to drain through opening 164, and land 154 of power spool 118 follows to cover conduit 300 and thus effect a transmission shift to first gear.

Second

Figure 5:
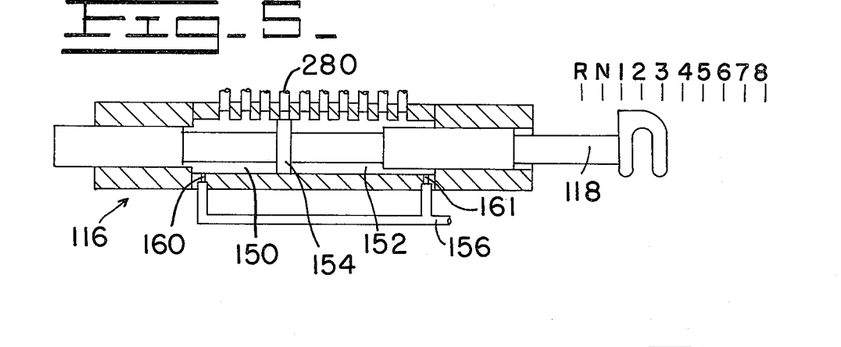
FIG. 5 is a fragmentary sectional view illustrating one of the components of the control in a different operational position from that shown in FIG. 3.

With the selection of second gear, spool 110 moves rightwardly to communicate conduit 292 to the drain 192 by virtue of the position of spool land 190. Spool land 113 now blocks conduits 296, 298 and 300 (R,N, 1), and opens manual valve compartment 302 to the full pressure, 125 to 450 p.s.i., in the line 304. Thus, hold lines 166, 168, 170, 172, 174 and 176 are all supplied with high pressure fluid such that all automatic selector valves 520–530 are held thereby overcoming the maximum pressure that could be supplied by the governor through conduits 218, 220 and 222. The selector valve members are held by the high pressure communicating through flow passages 652 to the cavities 651. Since conduit 292 opens to drain, conduit 280 communicating with 292 across the selector valves is also open to drain and power spool land 154 moves to a position across conduit 280 to effect a transmission shift to second gear (see FIG. 5).

Third

It should be noted that a shift from second to third, or for that matter any shift above second, places the system in the automatic as opposed to the manual range. Thus, moving the manual control spool to position 3 opens the hold line 166 to drain 192 and removes high pressure from cavity 651. The remaining hold lines are still at main pump pressure, however, via conduit 304 and manual spool cavity 302.

Whether or not the transmission is actually shifted into third gear forward after the manual spool 110 is placed in position 3 depends entirely upon vehicle speed. Viewing FIG. 8 in conjunction with FIGS. 3 and 4, it will be noted that if the vehicle speed is below 340 r.p.m. then the governor signal pressure (curve X) is less than 38 p.s.i. in conduit 218. Since the shift reference pressure in line 258 is 38 p.s.i., the selector valve spool 594 remains down (upper holding slug 578 has moved down since hold line 166 now leads to drain 192) and the power spool land 154 does not move from position 2 (FIG. 5) since line 280 is still open to drain via the selector valve conduits 280–290 and conduit 292.

Once the vehicle speed exceeds approximately 340 r.p.m. (FIG. 8) then the governor pressure in conduit 218 exceeds the 38 p.s.i. reference pressure supplied via conduit 258 to the pressure responsive area of valve member 594. Therefore, valve member 594 and slug 231 move up, closing off communication between conduit 280 and the drain 192 via conduits 282, 284, 286, 288, 290 and 292. Upward movement of spool 594 also opens conduit 310 to drain 192 via conduits 282–290 and 292 (see FIG. 6). Power spool 118 is then unbalanced due to a drop in pressure in compartment 152 and begins moving from second gear position to the right and the pressure available at the power spool is connected to conduit 280, communicated to spool cavity 306 above slug 231, and provides a "snap action" that moves spool 594 upwardly the full travel. Slug 231, of course, moves downwardly to contact plate 308. Previously blocked conduit 310 is open to drain via 282, etc., as mentioned above, such that compartment 152 of the power spool is depressurized allowing the power spool to move to the right to third position (see FIG. 6).

It should be noted that movement of the power spool 118 into third position causes movement of the spools 57'''-60''' (FIG. 2) and consequently a shift into third gear. As the shift to third gear is being made, the clutch fill pressure drops to approximately 55 p.s.i. This drop in pressure due to filling of the clutches is immediately sensed in both line 312 and 402 (see FIG. 4). This drop in pressure in line 312 causes the priority valve 142 to close under the action of spring 143 to the position shown. Closing of valve 142 ensures that the pressure in conduit 84 which supplies pressure to the holding lines via conduit 304 is maintained. It also ensures that the pressure in conduit 250, which ultimately supplies pressure to the shift reference valves, for establishing the shift reference pressures, is maintained. It should also be noted that when this pressure drop is communicated through conduit 402 the valve lands 407 move to the position shown and this prevents the governor 112 from sending any transient fluctuation signals (due to inertial changes within the power train) to the selector valves which signals might result in unwanted shifts.

Fourth through eighth

Upshifts continue in direct relationship to the position of manual control valve spool 110 and the governor pressures. At 491 r.p.m. (FIG. 8) governor curve X supplies sufficient pressure to the bottom of selector valve 522 to move spool 596 upwardly with the same "snap action" mentioned above. This opens conduit 312 to drain 192 via conduits 284, 286, 288, 290 and 292 and consequently power spool land 154 moves to position 4. Similarly, automatic selector valves 524, 526, 528 and 530 move upwardly achieving fifth through eighth gears as the corresponding governor upshift points are reached.

Downshifts

A downshift from third to second will now be described, it being understood that all downshifts in the automatic range occur in the same manner. Under conditions of high rolling resistance to the wheels of the vehicle, the output r.p.m. might drop below 340 r.p.m. (the upshift point) and still not influence the third gear condition shown by FIG. 6. A "spread" between upshift and downshift points occurs because the resultant pressure urging the selector spool upwardly is greater than the governor pressure provided through conduit 218, since the cavity 306 is open to the pressure in line 280 as shown in FIG. 6 when the spool 594 is in the upward position. However, should output r.p.m. continue to decrease resulting in a drop in governor pressure in conduit 218 below approximately 31 p.s.i. (see FIG. 8) the shift reference pressure of 38 p.s.i. acting on the top of holding slug 578 and selector spool 594 would overcome the upward forces acting on the bottom of spool 594 and in cavity 306 thereby causing (1) the drain 192 (via 282, etc. and 292) to be cut-off from conduit 310, and (2) conduit 280 to be communicated with the drain 192 via conduits 282, etc. and 292. Consequently, the power spool 118 would cause a downshift to second gear due to a reduction in pressure in compartment 150.

As shown in FIG. 4, a hold valve 408 may be incorporated in the system to prevent any automatic shift where the operator of the vehicle anticipates a need for preventing shifts in order to maintain engine speed at a given r.p.m. level. By operation of a foot-operated pedal 410, air at 100 p.s.i. is delivered from any suitable source to conduit 412 which urges spool 414 leftwardly overcoming the pressure of a spring 416. Leftward movement of spool 414 prevents the 96 p.s.i. fluid pressure in conduit 278 from reaching the power cylinder assembly 116 via conduit 156. As a result, all automatic and manual shifts are halted until the foot actuated pedal 410 is relieved.

With the structure disclosed herein, forced downshifts from eighth through third gears are eliminated to avoid overspeeding the engine beyond rated speed. Downshifts can still be forced into the first-neutral-reverse operation at any time. Downshifts cannot be forced because a forced downshift pressure signal is only effective on a selector valve when the valve member or spool of the particular selector valve has automatically downshifted. Once the selector valve member has automatically downshifted, the forced downshift pressure signal can then be applied to the particular selector valve member or spool to hold the latter valve member in downshifted position and prevent automatic upshifting thereof.

More particularly referring to FIG. 6, the power spool 118 is shown in third speed range. This condition has forced downshift pressure applied through line 168 to selector valve 522 with the pressure fluid passing through the flow passage 652 to the cavity 651 to maintain the selector valve member 596 in its downshifted position and with the holding slug 580 in an elevated position against the valve housing 308. There is sufficient pressure acting within the cavity 651 against the holding slug 580 to hold the selector valve member 596 in downshifted condition even if the pressure in line 218 from the output governor 112 is at its maximum pressure. Assuming the manual valve spool 110 is moved to a second speed range position, a downshift pressure signal is then also applied through the conduit 166 to the bore 606 of selector valve 520 having the selector valve member 594. In order to describe an attempt to have a forced downshift operation, it is necessary to assume that the transmission output speed is such as to provide a governor pressure signal in line 218 above a value of approximately 32 p.s.i. which is the downshift point in automatic downshift from 3 to 2. With this assumption, the selector valve member 594 is in the upshifted position, shown in FIG. 6, and, therefore, the forced downshift pressure signal delivered through hold line 166 cannot reach the cavity 651 of the selector valve member 594 since the flow passage 652 is blocked by a land on the valve member from communication with the hold line 166, as shown in FIG. 6.

When automatic downshift occurs for the selector valve member 594 at approximately 32 p.s.i. as indicated in the graph of FIG. 8, the flow passage 652 moves into communication with the line 166 whereby the forced downshift pressure signal may communicate with the cavity 651 of selector valve member 594 and maintain the selector valve member in its downshifted condition and with the holding slug 578 against the upper end of the selector valve housing 308. A forced downshift is prevented until the transmission output speed is at a value where the automatic downshift occurs. The shift reference pressure signal delivered through conduit 258 is applied to a pressure-responsive area including the upper end of the holding slug 578 and the end of the annular wall of the valve member 594. The holding slug blocks communication between the flow passage 652 and the upper end of the selector valve wherein the shift reference pressure signal is not communicated with this flow passage. As seen with respect to the selector valve member 594 in FIG. 6, the cavity 651 communicates with a drain passage 700 through the flow passage 652 when the selector valve member is in upshifted position and this same action occurs with respect to all of the selector valves 520–530.

With the selective communication of a valve member cavity 651 with a forced downshift pressure signal, dependent upon the position of the valve member and whether or not the flow passage 652 is in communication with the line delivering the forced downshift pressure signal, it is possible to prevent forced downshifts until the transmission output speed is such as to cause an automatic downshift.

I claim:

1. A hydraulic control system for a multiple speed ratio power transmission mechanism having a plurality of drive establishing means and an output member; said control system comprising a fluid pressure source; hydraulic governor means in fluid communication with said fluid pressure source and operably connected to said transmission output member for producing a plurality of hydraulic governor pressure signals that are functionally related in magnitude to the speed of said output member; a plurality of selector valves with valve members each of which is operable to automatically select and initiate a different speed ratio change; conduit structure for transmitting one of each of said governor pressure signals to a first end of different ones of said selector valves; means in fluid communication with said fluid pressure source for producing a plurality of distinct and smaller shift reference pressures than the pressure emanating from said fluid pressure source; conduit structure for transmitting one of each of said shift reference pressures to a second end of different ones of said selector valves; whereby said selector valves automatically initiate an upshift to a speed ratio resulting in higher speed for said output member when said governor pressure signals exceed said shift reference pressure values and automatically initiate a downshift to a speed ratio resulting in a lower speed for said output member when said shift reference pressure values exceed said governor pressure signals by a predetermined amount; means for delivering an operator established forced downshift pressure signal to a selector valve; and means on a selector valve member for preventing application of said forced downshift pressure signal thereto until the selector valve has moved to a position to automatically establish a downshift.

2. A control system as defined in claim 1 wherein each of said selector valve members has a cavity in an end thereof with a surrounding wall having a flow passage to the base of the cavity, a movable slug in the cavity to establish, with said surrounding wall, a pressure-responsive area subjected to shift reference pressure; and a housing for said selector valve member having a port for receiving said forced downshift pressure signal, said port communicating with said flow passage only when the selector valve has moved to said position.

3. A control system as defined in claim 2 wherein said housing has a drain port and said flow passage communicates with said drain port when said selector valve member is remote from said position.

4. A control system as defined in claim 3 wherein said movable slug blocks fluid communication between said flow passage and said shift reference pressure whereby the base of said cavity may be connected to the drain port and the application of shift reference pressure will be effective against said pressure-responsive area.

5. A hydraulic control system for a multispeed transmission having drive components associated to produce a preselected group of gear ratios in an automatic range of operation, said control system comprising: a group of automatic selector valves; means for applying at least three different shift reference pressures to at least three different ones of said automatic selector valves; a manual control valve for directing a forced downshift pressure signal to one or more of said selector valves; a power control valve; fluid conduit connections interconnecting said manual control valve with both said group of automatic selector valves and said power control valve; said power control valve connected to gear ratio control means for producing a selected gear ratio in the automatic range; hydraulic governor means for establishing plural different governor pressures representative of transmission output speed; means including the selector valves responsive to variations in transmission output speed by comparison of a shift reference pressure and a governor pressure to automatically upshift and downshift the transmission within the automatic range of operation and up to the highest gear selected by positioning of said manual control valve; and means for inhibiting a manually demanded forced downshift if the governor pressure applied to a selector valve indicates an excessive speed of the transmission output including a plurality of valve means associatd one with each selector valve and having a position to block application of a forced downshift pressure signal to the associated selector valve until the selector valve automatically downshifts at a predetermined governor pressure.

6. A hydraulic control system for a multispeed transmission having drive components associated to produce a preselected group of gear ratios in an automatic range of operation, said control system comprising: a manual control valve providing a forced downshift pressure signal; a power control valve connected to gear ratio control means for producing gear ratios in the automatic range; means providing plural different shift reference pressure signals; governor means providing pressure signals corresponding to transmission output speed; means including two selector valves subjected to the same governor pressure signal and each to a different shift reference pressure signal to automatically upshift and downshift the transmission within the automatic range of operation and up to the highest gear selected by positioning of said manual control valve; means for directing a forced downshift pressure signal to one of said selector valves; and means for inhibiting movement of said two selector valves and downshift of said transmission as demanded by positioning of the manual control valve at a lower gear setting until a predetermined lower governor pressure signal is reached by blocking of said forced downshift pressure signal from action on said one selector valve until said one selector valve automatically downshifts.

7. A hydraulic control system as defined in claim 6 including a pressure-responsive area on a valve member of each of said selector valves to receive said forced downshift pressure signal; said blocking means comprising means on said valve member to block application of the forced downshift pressure signal in said area in one position of the valve member and to permit application of said last-mentioned signal in a second downshifted position; and said governor pressure signal acting to hold the valve member in said one position until the governor pressure signal reaches a level wherein automatic downshift occurs.

* * * * *